United States Patent
Yekollu et al.

(10) Patent No.: US 11,507,548 B1
(45) Date of Patent: Nov. 22, 2022

(54) SYSTEM AND METHOD FOR GENERATING A CLASSIFICATION MODEL WITH A COST FUNCTION HAVING DIFFERENT PENALTIES FOR FALSE POSITIVES AND FALSE NEGATIVES

(75) Inventors: Srikar Yekollu, Sunnyvale, CA (US);
Madhu M. Kurup, Bellevue, WA (US);
Jeremy L. Calvert, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2160 days.

(21) Appl. No.: 13/239,021

(22) Filed: Sep. 21, 2011

(51) Int. Cl.
*G06F 16/215* (2019.01)

(52) U.S. Cl.
CPC .................. *G06F 16/215* (2019.01)

(58) Field of Classification Search
USPC .......................................................... 707/687
See application file for complete search history.

(56) References Cited

U.S. PATENT DOCUMENTS

| | | | |
|---|---|---|---|
| 6,556,991 B1 * | 4/2003 | Borkovsky | 707/737 |
| 6,622,134 B1 * | 9/2003 | Sorkin | G06F 21/56 706/20 |
| 6,757,678 B2 * | 6/2004 | Myllymaki | |
| 7,082,426 B2 * | 7/2006 | Musgrove et al. | |
| 7,702,631 B1 * | 4/2010 | Basu et al. | 707/999.006 |
| 7,827,186 B2 | 11/2010 | Hicks | |
| 8,015,124 B2 | 9/2011 | Milo et al. | |
| 8,548,878 B1 * | 10/2013 | Graham et al. | 705/27.2 |
| 8,577,814 B1 * | 11/2013 | Wu | G06N 3/126 706/12 |
| 2002/0107861 A1 * | 8/2002 | Glendinning | G06Q 30/02 |

(Continued)

OTHER PUBLICATIONS

Bilenko et al., "Learning to Combine Trained Distance Metrics for Duplicate Detection in Databases", Technical Report AI-02-296, Artificial Intelligence Lab, University of Texas at Austin, Feb. 2002.*

(Continued)

*Primary Examiner* — Mohsen Almani
(74) *Attorney, Agent, or Firm* — Robert C. Kowert; Kowert, Hood, Munyon, Rankin & Goetzel, P.C.

(57) ABSTRACT

Embodiments of a system and method for generating a classification model with a cost function having different penalties for false positives and false negatives are described. Embodiments may include perform machine learning operations on known duplicates and known non-duplicates to generate a classification model for classifying structured data items as duplicates or non-duplicates. Each duplicate may represent a pair of structured data items describing a common item; each non-duplicate may represent a pair of structured data items describing different items. Generation of the classification model may be performed based on a cost function that penalizes false positive misclassifications within the classification model differently than false negative misclassifications. Embodiments may also include evaluating the classification model to determine whether a candidate structured data item is a duplicate or non-duplicate. The classification model may include but is not limited to support vector machines and boosted decision trees.

29 Claims, 8 Drawing Sheets

(56) References Cited

U.S. PATENT DOCUMENTS

| | | | | |
|---|---|---|---|---|
| 2008/0281767 | A1* | 11/2008 | Garner | G06N 3/0481 706/25 |
| 2009/0198678 | A1 | 8/2009 | Conrad et al. | |
| 2012/0278263 | A1* | 11/2012 | Borthwick | G06F 16/215 706/12 |
| 2012/0302572 | A1* | 11/2012 | Kan | C12Q 1/6886 514/249 |
| 2014/0310808 | A1* | 10/2014 | Yao | H04L 63/145 726/22 |

OTHER PUBLICATIONS

Bilenko, Mikhail, and Raymond J. Mooney. "Adaptive duplicate detection using learnable string similarity measures." Proceedings of the ninth ACM SIGKDD international conference on Knowledge discovery and data mining. ACM, 2003.*

Bilenko, Mikhail, Basu, Sagato, and Mehran Sahami. "Adaptive product normalization: Using online learning for record linkage in comparison shopping." Data Mining, Fifth IEEE International Conference on. IEEE, 2005.*

Chawla, Nitesh V. "Data mining for imbalanced datasets: An overview." Data mining and knowledge discovery handbook. Springer, Boston, MA, 2009. 875-886. (Year: 2009).*

Lin, Yi, Yoonkyung Lee, and Grace Wahba. "Support vector machines for classification in nonstandard situations." Machine learning 46.1-3 (2002): 191-202. (Year: 202).*

Frean, Marcus, and Tom Downs. A simple cost function for boosting. Technical report, Dep. of Computer Science and Electrical Engineering, University of Queensland, 1998. (Year: 1998).*

Fan, Wei, et al. "AdaCost: misclassification cost-sensitive boosting." Icml. vol. 99. 1999. (Year: 1999).*

Lee ML, Ling TW, Low WL. Intelliclean: a knowledge-based intelligent data cleaner. InProceedings of the sixth ACM SIGKDD international conference on Knowledge discovery and data mining Aug. 1, 2000 (pp. 290-294). (Year: 2000).*

Rahm E, Do HH. Data cleaning: Problems and current approaches. IEEE Data Eng. Bull.. Dec. 2000;23(4):3-13. (Year: 2000).*

Carvalho MG, Laender AH, Gonçalves MA, da Silva AS. Replica identification using genetic programming. InProceedings of the 2008 ACM symposium on Applied computing Mar. 16, 2008 (pp. 1801-1806). (Year: 2008).*

Tejada, Sheila, Craig A. Knoblock, and Steven Minton. "Learning object identification rules for information integration." Information Systems 26.8 (2001): 607-633: (Year: 2001).*

Song Q, Shepperd M. Missing data imputation techniques. International journal of business intelligence and data mining. Oct. 1, 2007;2(3):261-91. (Year: 2007).*

Sariyar M, Borg A, Pommerening K. Missing values in deduplication of electronic patient data. Journal of the American Medical Informatics Association. Jun. 1, 2012;19(e1):e76-82. (Year: 2012).*

Karr AF, Sanil AP, Banks DL. Data quality: A statistical perspective. Statistical Methodology. Apr. 1, 2006;3(2):137-73. (Year: 2006).*

Kluwer Academic Publishers, C. Cortes and V. Vapnik, Support-vector networks in Machine Learning, pp. 273-297, 1995.

T. Joachims, A Statistical Learning Model of Text Classification with Support Vector Machines. Proceedings of the 24th annual international ACM SIGIR conference on Research and development in information retrieval, pp. 128-136, ACM, 2001.

Vapnik, Vladimir N., An Overview of Statistical Learning Theory, IEEE Transactions on Neural Networks, vol. 10, No. 5, Sep. 1999. pp. 988-999.

F. Yoav and S. Robert E. A short introduction to boosting. Journal of Japanese Society for Artificial, IntelligenceJournal of Japanese Society for Artificial Intelligence, 14(5)771-780, 1999.

Mikhail Bilenko and Raymond J. Mooney, Adaptive Duplicate Detection Using Learnable String Similarity Measures, In Proceedings of the Ninth ACM SIGKDD International Conference on Knowledge Discovery and Data Mining, 2003, pp. 39-48.

* cited by examiner

SYSTEM AND METHOD FOR GENERATING A CLASSIFICATION MODEL WITH A COST FUNCTION HAVING DIFFERENT PENALTIES FOR FALSE POSITIVES AND FALSE NEGATIVES

BACKGROUND

Merchants that operate network-accessible marketplaces may maintain electronic catalogs that include thousands of items (or more) offered for sale. These electronic catalogs often include item detail pages accessible through one or more networks (e.g., web pages accessible over the Internet). These item detail pages often include descriptive information (e.g., text descriptions, pictures or video) in order to assist a buyer in determining whether an item is worth purchasing. In many cases, this descriptive information may be based on information from manufacturers or suppliers of the items offered for sale. In some cases, different manufacturers and suppliers may provide the descriptive information to the merchant in different formats. For example, one supplier may list one type of identifier for an item as a part number whereas another supplier of that same item might list that identifier as a model number. In some cases, a merchant may maintain a very large catalog of items sourced from different suppliers. Due at least in part to variations in item information received from different suppliers of the same item as well as the sheer quantity of information that some merchants are responsible for, identifying duplicate item information (e.g., two sets of item information that may be different to some extent but nevertheless describe the same item) may not be an insignificant task.

Figure 1:
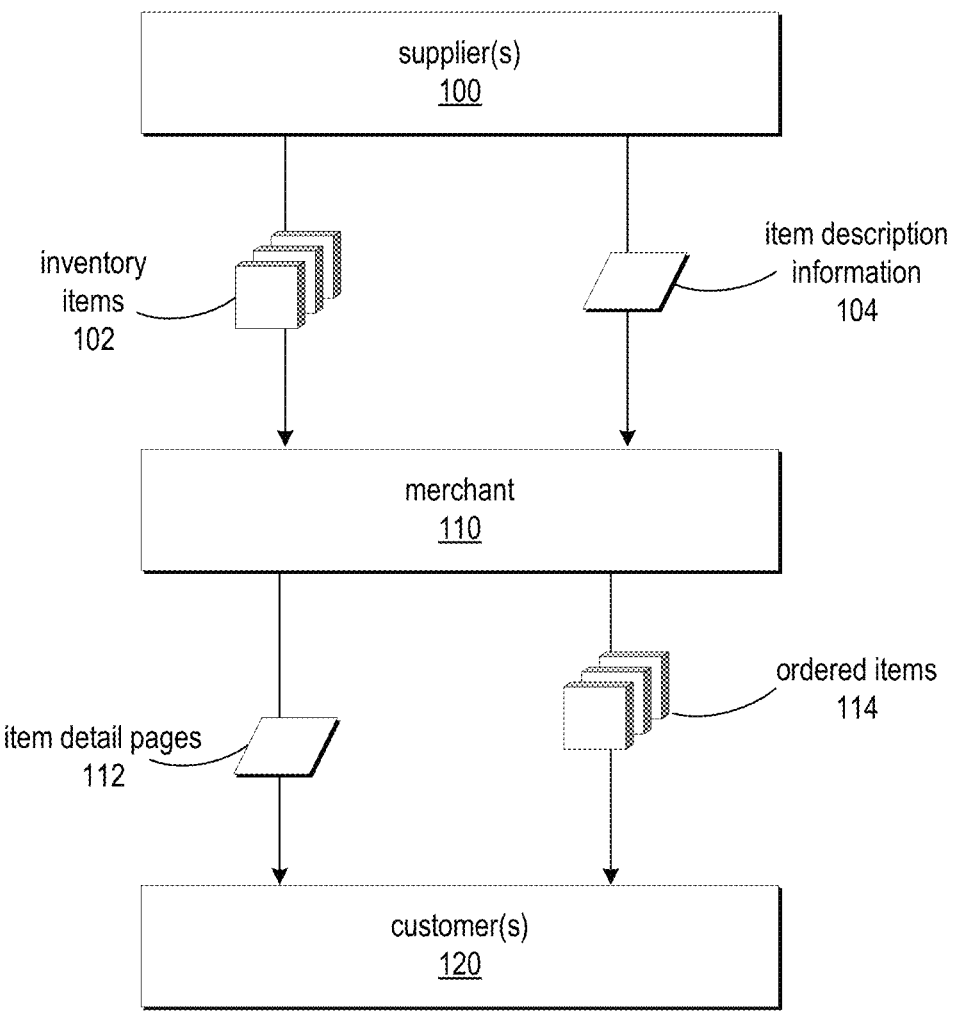
FIG. 1 illustrates a block diagram of the interactions between one or more suppliers, a merchant, and one or more customers, according to some embodiments.

While the system and method for generating a classification model with a cost function having different penalties for false positives and false negatives. for rule-based duplicate detection is described herein by way of example for several embodiments and illustrative drawings, those skilled in the art will recognize that the system and method for generating a classification model with a cost function having different penalties for false positives and false negatives is not limited to the embodiments or drawings described. It should be understood, that the drawings and detailed description thereto are not intended to limit the system and method for generating a classification model with a cost function having different penalties for false positives and false negatives to the particular form disclosed, but on the contrary, the intention is to cover all modifications, equivalents and alternatives falling within the spirit and scope of the system and method for generating a classification model with a cost function having different penalties for false positives and false negatives as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for generating a classification model with a cost function having different penalties for false positives and false negatives are described. The classification models described herein may include models generated with machine learning techniques including but not limited to support vector machines (SVMs) and boosted decision trees. For a given candidate pair of structured data items, the classification models described herein may be evaluated to determine in which of two categories that candidate pair is classified. These two categories are largely described herein as duplicate and non-duplicate, although embodiments are not limited to these classifications.

In various embodiments, a false positive may be characterized as the misclassification of a non-duplicate as a duplicate. Likewise, a false negative may in various embodiments be characterized as the misclassification of a duplicate as a non-duplicate. The machine learning techniques utilized to generate the classification models described herein may be intentionally subjected to a cost function that penalizes false positives and false negatives differently. For instance, embodiments may include determining multiple candidate solutions (e.g., multiple hyperplane solutions of a support vector machine, etc.) for the classification model and selecting the candidate solution that minimizes the cost function. If the cost function is, for example, weighted such that false positives misclassifications are penalized more than false negatives (e.g, such that one false positive carries more penalty than one false negative), the ultimate candidate solution that is selected in accordance with the cost function may be less likely to result in a false positive when used for classification (e.g., less likely relative to the other candidate solutions).

By penalizing different misclassifications (e.g., false positives and false negatives) of structured data items differently, embodiments may accommodate situations that assign different levels of importance to such misclassifications. One example of such a situation is described below with respect to FIG. 1.

FIG. 1 illustrates a flow diagram of interactions between a merchant and its suppliers and customers. In the illustrated embodiments, merchant 110 may receive inventory items 102 from one or more suppliers. These suppliers may also provide item description information 104 to the merchant. For instance, the item description information may include details and characteristics (e.g., images, videos, text descriptions, specifications, part numbers, model numbers, manufacturer information and other information about an item) that may be used to construct item detail pages 112 viewed by customers; customers may order items 114 from the merchant based on information in the item detail pages. In various embodiments, the merchant may use the item description information as the basis for identifying an item received from a supplier. In many cases, the provided item description information may vary among different suppliers, even in cases where the item description information pertains to the same item. For example, the item description information may differ across suppliers for any of a variety of reasons including but not limited to differences in nomenclature or differences in the amount of detail that a merchant provides for a given item.

In various embodiments, item description information may be stored by the merchant as item description entries which may adhere to a structured or semi-structured format. For clarity of description, different item description entries that pertain to the same item may be referred to herein as duplicate item description entries. The classification models described herein may be configured to analyze item description entries in order to determine whether the item description entry for one item and the item description entry for another item are duplicates.

In some embodiments, the duplicate detection engine may be utilized to identify duplicate item description entries (e.g., entries that correspond to the same item offered for sale) such that the entries may be merged. For example, a merchant may rely on item description entries to generate item detail pages that are available to customers. For instance, item detail pages could be web pages available through a network-based marketplace and customers could browse such item detail pages from remote client devices equipped with web browsers. In this example, the presence of duplicate item description entries could result in the creation of two or more item detail pages for the same item. In some cases, it may be desirable to avoid this situation as it may provide a fragmented browsing experience for customers and may discourage price competition among third party sellers. By identifying and merging duplicate item description entries, embodiments may prevent the creation of two or more item detail pages for the same item. The situation above may be characterized as a false negative as the merchant failed to identify two items as duplicates when those items were actually duplicates. While this may fragment the browsing experience because two redundant item detail pages (e.g., web pages that offer the items for sale) may be created for the same item, it is unlikely to cause significant harm to the customer-merchant relationship. For instance, if a customer orders the item from either of the redundant web pages, the customer will still receive the item they expect to receive (e.g., the item they ordered).

On the other hand, false positives may cause more harm to the customer-merchant relationship. Consider the case where a false positive in the merchant's classification scheme leads the merchant to believe that item A and item B are duplicates when in reality they are very different items. In this case, the merchant may mistakenly merge its representation of the two different items into a common representation, such as by merging the item detail pages and/or the inventory records of the two items. As such, a customer that orders item A might erroneously receive item B or vice versa. In the examples above, the customer-merchant relationship is more severely impacted in a negative manner by false positive misclassification of two non-duplicates as a duplicate.

As noted above, by penalizing different misclassifications (e.g., false positives and false negatives) differently within the cost function described herein to generate classification models, embodiments may accommodate situations that assign different levels of importance to such misclassifications. In the merchant examples above, biasing the cost function to penalize false positives (e.g., the misclassification of a candidate pair as duplicates) more than false negatives (e.g., the misclassification of a candidate pair as non-duplicates) may reduce the chance that the resulting classification model will return false positives and, within the context of the example above, reduce the probability of a customer receiving the wrong item.

Figure 2:
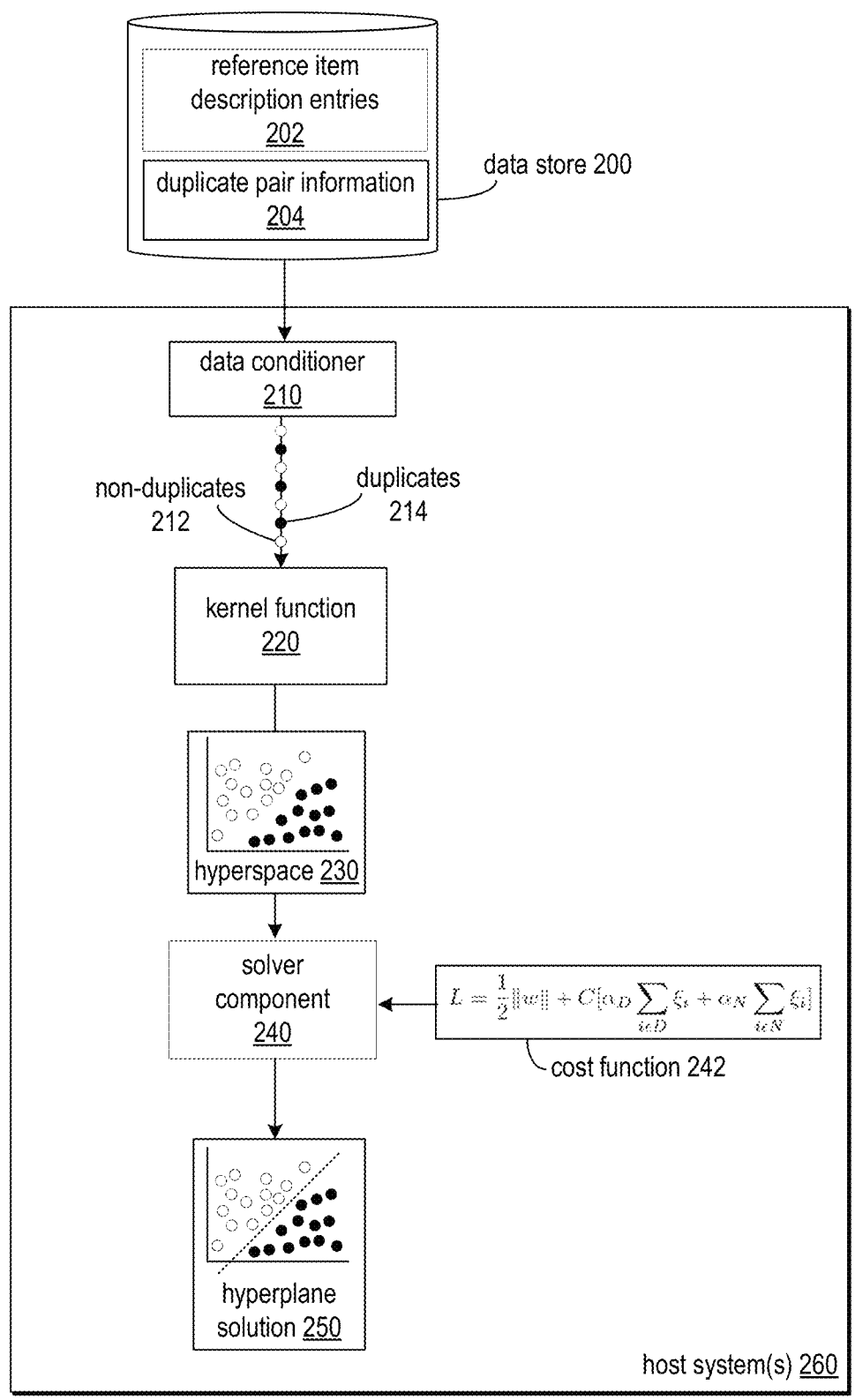
FIG. 2 illustrates a block diagram of the components used to generate a support vector machine classification model for classifying structured data items as duplicates or non-duplicates, according to some embodiments.

FIG. 2 illustrates a block diagram of the elements used to generate a classification model using the principles of support vector machines, according to some embodiments. In the illustrated embodiment, a data store 200 may store reference item description entries 202. These item description entries may be based on item information, such as item description information 104 of FIG. 1. However, embodiments are not limited to entries that strictly describe items offered by a merchant. In general, entries may include information that describes anything including but not limited to items, people, places, things, patterns or any other type of information. Duplicate pair information 204 may specify which entries 202 are duplicates and which entries 202 are non-duplicates. Essentially, duplicate pair information 204 includes the requisite information for transitioning the one-dimensional collection of entries 202 to a two dimensional pair list including duplicate pairs and non-duplicate pairs.

Host system(s) 260 may include various components to generate a hyperplane solution that will serve as a component of the support vector machine classification model. In various embodiments, host system(s) 260 may be implemented as one or more computer systems, such as the computer system of FIG. 7 described below. The components illustrated within host system(s) 260 may be implemented as computer-executable instructions on such a computer system. Likewise, data structures and other information represented within host system(s) 260 may be stored within memory of such a computer system. In some cases, the data of data store 200 may also be stored within such memory.

Data conditioner component 200 may evaluate some or all of the information of data store 200 to generate multiple structured data items illustrated as known non-duplicates 212 and known duplicates 214. In various embodiments, each non-duplicate 212 may represent a pair of entries 202 that are non-duplicates (e.g., as specified by duplicate pair information 204). Likewise, each duplicate 214 may represent a pair of entries 202 that are duplicates (e.g., as specified by duplicate pair information 204). In various embodiments, entries 202 may be structured as a list of key value pairs and data conditioner 210 may perform an operation on corresponding values (e.g., values with common keys) to generate a corresponding result value that is represented in a structured data item of non-duplicates 212 or duplicates 214. In some embodiments, the structured data items described herein, including non-duplicates 212 and duplicates 214, may be structured as n-dimensional vectors where each component value of the vector represents the result of some comparison between an item description entry pair (either duplicate or non-duplicate).

In some embodiments, host system(s) 260 may have access to multiple rule conditions from a set of duplicate detection rules, which in some cases are generated using genetic techniques or other machine learning techniques. In this example, each rule condition may be used to evaluate one or more key-value attributes of an item description entry pair and the result of each rule condition may be stored in the corresponding vector component of one of the structured data items 212 and 214. In this case, if there are n rule conditions, the vectors that represent non-duplicates 212 and duplicates 214 may have dimension n. In various embodiments, the rule conditions describe above may be evaluated both symmetrically and asymmetrically. In some embodiments, symmetric evaluation requires that the attribute condition be met in both directions (from one item entry to another and vice versa) in order to be true whereas asymmetric evaluation does not have such requirement. In effect, depending on which type of evaluation is employed, different data sets of structured data items may result. In some cases, the data set 212 and 214 may include only items resulting from symmetric evaluation. In other cases, the data set may include only items resulting from asymmetric evaluation. In yet other cases, the data set may include a combination of these two data sets. Data conditioner 210 may generate any of these types of data sets.

In some embodiments, different data sets may also be formed based on how missing attributes are accounted for. For instance, in some embodiments, attributes of the structured data items 212 and 214 may be represented within an acceptable range defined as a monotonic scalar or in binary form (e.g., range is [0,1]). As noted above, the structured data items may have dimension n, but there may be no guaranteed that the item entries have n attributes. In some cases, item entries may have far less than n attributes. Embodiments may employ two primary options when accounting for these missing attributes. In one case, using an example acceptable range of [0, 1] the data conditioner 210 may populate these missing attributes with a small value within the bounds of the acceptable range (e.g., 0.1) or a value outside of the acceptable range (e.g., 2). In some embodiments, the two different approaches (e.g., inner vs. outer) may define two different types of data sets.

Consistent with the above variations (e.g., symmetric representation, asymmetric representation, combined symmetric and asymmetric, inner missing attribute representation, and outer missing attribute representation) and/or other variations not specified herein, there may exist many different data sets for which classification models may be generated. Additionally, in some embodiments, there may be multiple different kernel functions (described in more detail below with respect to kernel function 220) with which to process such data sets. The particular combination of which data set and which kernel function to utilize when generating a classification model according in accordance with SVMs may be determined according to a fitness function $f_D(A)$, which is defined below.

$$f_D(A)=\omega*\text{precision}(A,D)+(1-\omega)\text{recall}(A,D) \quad (1)$$

In the fitness function above, A may represent the particular algorithm being utilized (e.g., a particular kernel function) and D may represent the particular data set being evaluated. Different precision and recall functions may be utilized; for the purposes of identifying a dataset and kernel function to utilize, these function should remain be consistent across the evaluation. In some embodiments, the fitness function may be modified but generally adheres to the following requirements: the fitness is a function of both precision and recall, it is comparable across experiments with different algorithms while using the same dataset, and it specifies the trade-off between precision and recall. In example fitness function $f_D(A)$, this tradeoff is implemented by the $\omega$ variable. For instance, if a trade off precision to recall is desired in the ratio of 1:4, a $\omega$ value of ⅘ (or 0.8) may be utilized.

As described above, numerous variations (e.g., symmetric representation, asymmetric representation, combined symmetric and asymmetric, inner missing attribute representation, and outer missing attribute representation) are possible for the data set. In some embodiments, the data set may be chosen first before the kernel function by using a same test kernel function across the data sets (e.g., test the fitness of each data set with a liner kernel function). Once a particular data set is determined, the data set may be utilized across different kernel functions to identify the kernel function with the best fitness value in accordance with the fitness function. In general, any number of kernel functions and data sets may be evaluated in this manner. The remainder of this description is described within the context of a kernel function and data set already being isolated for use in accordance with these techniques (or some other technique for selecting a kernel function and dataset).

Kernel function 220 may map non-duplicates 212 and duplicates 214 into an n-dimensional hyperspace 230. For instance, as demonstrated above, non-duplicates 212 and duplicates 214 may be represented by n-dimensional vectors. However in some cases, kernel function 220 may map the non-duplicates 212 and the duplicates 214 into a hyperspace having a higher dimension n+x where x is a positive integer. This higher dimension hyperspace may in some cases be referred to as a feature space. Using a kernel function that maps n-dimensional duplicates and non-duplicates into a higher dimension feature space may in some cases be useful in order to find a relatively clean separation between the duplicates and the non-duplicates such that a suitable hyperplane solution may be solved for.

Solver component 240 may solve the hyperspace 230 for a hyperplane solution 250. In a mathematically ideal case, the solver component may solve for a hyperplane that cleanly separates the non-duplicates from the duplicates within the hyperspace. Furthermore, the solver component generally seeks to maximize the margin (or free space) between the hyperplane and the nearest-neighbor duplicates and non-duplicates. Generally, if the hyperspace (or feature space) 230 is n-dimensional, the hyperplane will be of n−1 dimension. For example, if the hyperspace is represented as three dimensional, they hyperplane may be a two dimensional plane. Likewise, a 100-dimensional hyperspace may be solved for a 99-dimensional hyperplane, and so on. In various embodiments, the solver may employ a variety of techniques to determine the hyperplane including but not limited to those employed by quadratic programming (QP) solvers. In some cases, a solution in which all duplicates are isolated on one side of the hyperplane and all non-duplicates are isolated on another side of the hyperplane may not be achieved. In these cases, solver component 250 may solve for a hyperplane that most cleanly separates the duplicates and non duplicates.

In various embodiments, solver component 240 may generate the hyperplane solution 250 based on a cost function 242. In some embodiments, this may involve minimizing the cost function. One example of a cost function is defined below.

$$L = \frac{1}{2}\|\omega\| + C\left[\alpha_D \sum_{i \in D} \xi_i + \alpha_N \sum_{i \in N} \xi_i\right] \quad (2)$$

In the cost function above, L may represent a cost value, w may represent the vector normal to the hyperplane, $\|\omega\|$ may represent the norm of that vector, C may be a configurable constant, and $\xi$ may represent an error value or function associated with a misclassification. As noted by D (e.g., the number of misclassified duplicates) and N (e.g., the number of misclassified non-duplicates) in the cost function, misclassifications of duplicates (i.e., false negatives) and misclassifications of non-duplicates (i.e., false positives) may be accounted for separately. In addition to accounting for false positives and false negatives separately, these values may also be weighted differently within the cost function, as noted by the distinct weighting factors $\alpha_D$ and $\alpha_N$. For instance, in one non-limiting example, $\alpha_D$ may be set to 10 times the value of $\alpha_N$. In this way, when solver component 240 solves for the hyperplane by minimizing the cost function, false positives may be penalized more heavily than false negatives. In various embodiments, when an ideal solution is not available (i.e., when some portion of the data resides on the "wrong" side of the hyperplane), the solver component may favor a hyperplane solution in which the misclassified data represents misclassified duplicates (i.e., false negatives) over misclassified non-duplicates (i.e., false positives).

Figure 3:
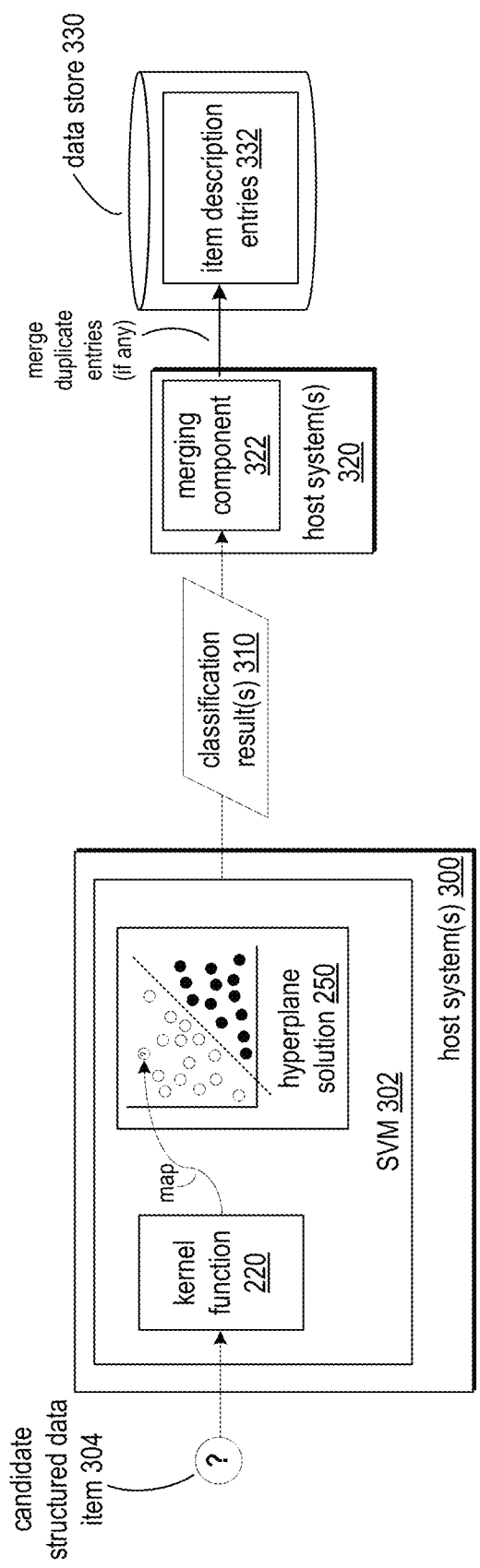
FIG. 3 illustrates a block diagram of the components used to evaluate a support vector machine classification model for classifying structured data items as duplicates or non-duplicates, according to some embodiments.

In various embodiments, the collection of kernel function 220, hyperspace 230 and hyperplane solution 250 may form a support vector machine that may serve as a classification model that may be evaluated to classify newly considered structured data items, which may be referred to herein as candidates. FIG. 3 illustrates a block diagram including the evaluation of such a support vector machine serving as a classification model for classifying candidates as duplicates or non-duplicates.

In the illustrated embodiments, the classification model may be implemented as support vector machine 302 on one or more host systems 300. In various embodiments, host system(s) 300 may be implemented as one or more computer systems, such as the computer system of FIG. 7 described below. The components illustrated within host system(s) 300 may be implemented as computer-executable instructions on such a computer system. Likewise, data structures and other information represented within host system(s) 300 may be stored within memory of such a computer system. In some cases, the candidate structured data item may also be stored within such memory.

In the illustrated embodiment, SVM 302 may be configured to evaluate one or more candidate structured data items, such as candidate structured data item 304. The candidate may in various embodiments represent a duplicate or a non-duplicate and the SVM may perform various operations in order to generate a classification result 310 that indicates whether the candidate is classified as a duplicate or a non-duplicate.

To determine whether the candidate is to be classified as a duplicate or a non-duplicate, SVM 302 may evaluate the candidate 304 with kernel function 220 in order to map the candidate to a location within the hyperspace of hyperplane solution 250. In various embodiments, one portion of the hyperspace may be associated with a duplicate classification result and another portion of the hyperspace may be associated with a non-duplicate classification result. Generally, the duplicate portion resides on one side of the hyperplane and the non-duplicate portion resides on another side of the hyperplane solution. SVM 302 may be configured to determine in which of those portion the candidate resides (in accordance with the mapping performed by the kernel function). If the candidate resides in the duplicate portion, SVM 302 may generate classification result 310 such that the classification result indicates the candidate is a duplicate. If the candidate resides in the non-duplicate portion, SVM 302 may generate classification result 310 such that the classification result indicates the candidate is a non-duplicate.

In some embodiments, the classification result(s) 310 may be provided to a merging component 322 implemented on a host system 320, which may be a computer system, such as the computer system of FIG. 7 described below. In various embodiments, the merging component may be configured to determine whether the classification result indicates the candidate is a duplicate and, if so, generate an instruction or other indication to merge the corresponding pair of item description entries within data store 330. In various embodiments, these item description entries 332 may serve as the information from which item detail pages 112 (FIG. 1) are generated. As such, merging duplicates within data store 330 may propagate to the item detail pages and solve the fragmentation of item detail pages for the same item. Similarly, by penalizing false positives using the cost function described above, the chance of mistakenly merging the item description entries (and corresponding item detail pages) is minimized. Nevertheless, in some cases where perfect precision cannot be guaranteed (e.g., when at least some non-duplicates map to the "duplicate" side of the hyperplane), one or more human agents may review and confirm the classification results prior to merging.

Figure 4:
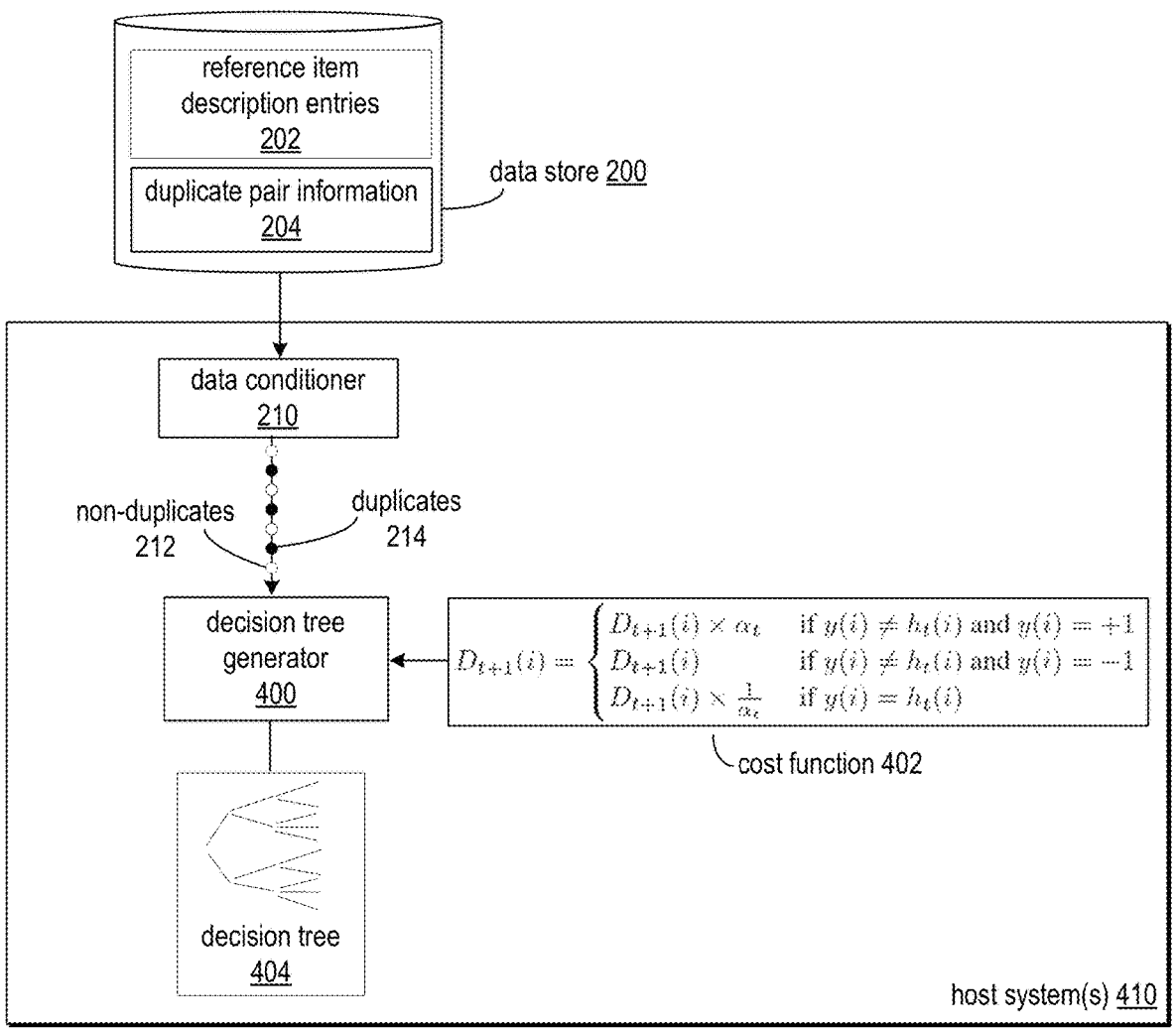
FIG. 4 illustrates a block diagram of the components used to generate a boosted decision tree classification model for classifying structured data items as duplicates or non-duplicates, according to some embodiments.

FIG. 4 illustrates a block diagram of the elements used to generate a classification model using the principles of boosted decision trees, according to some embodiments. In the illustrated embodiment, similar to FIG. 2, a data store 200 may store reference item description entries 202 described above. These item description entries may be based on item information, such as item description information 104 of FIG. 1. However, embodiments are not limited to entries that strictly describe items offered by a merchant. In general, entries may include information that describes anything including but not limited to items, people, places, things, patterns or any other type of information. As is the case in FIG. 2, duplicate pair information 204 may specify which entries 202 are duplicates and which entries 202 are non-duplicates. Essentially, duplicate pair information 204 includes the requisite information for transitioning the one-dimensional collection of entries 202 to a two dimensional pair list including duplicate pairs and non-duplicate pairs.

Host system(s) 410 may include various components to generate a decision tree that will serve as a component of the decision tree classification model. In various embodiments, host system(s) 410 may be implemented as one or more computer systems, such as the computer system of FIG. 7 described below. The components illustrated within host system(s) 410 may be implemented as computer-executable instructions on such a computer system. Likewise, data structures and other information represented within host system(s) 410 may be stored within memory of such a computer system. In some cases, the data of data store 200 may also be stored within such memory.

In various embodiments, data conditioner 210 may perform in a manner similar to that described above with respect to FIG. 2 in order to generate known non-duplicates 212 and known duplicates 214. Decision tree generator 400 may be configured to evaluate non-duplicate 212 and known duplicates 214 to generate a decision tree 404. As described below with respect to FIG. 5, this decision tree may be evaluated to classify candidate structured data items as duplicates or non-duplicates. In various embodiments, decision tree generator may utilize adaptive boosting and an associated cost function 402 to generate the decision tree. In various embodiments, adaptive boosting may include an iterative algorithm that trains a weak learner (e.g., decision trees) with respect to a probability distribution maintained over training examples. At each iteration, the probability distribution may penalize the misclassified data points such that the subsequent classifier (i.e., the decision tree) that is generated concentrates more on these penalized data points. In various embodiments, a cost function 402 that penalize false positive and false negatives differently within the adaptive boosting algorithm. In various embodiments, this cost function may cause the distribution of weights $D_t$ within the distribution at iteration t to be structured such that the distribution is biased towards false positive over false negatives. One example of such a cost function is specified below.

$$D_{t+1}(i) = \begin{cases} D_{t+1}(i) \times \alpha_t & \text{if } y(i) \neq h_t(i) \text{ and } y(i) = +1 \\ D_{t+1}(i) & \text{if } y(i) \neq h_t(i) \text{ and } y(i) = -1 \\ D_{t+1}(i) \times \dfrac{1}{\alpha_t} & \text{if } y(i) = h_t(i) \end{cases} \quad (3)$$

In the cost function above, $D_t(i)$ may represent the point probability of data point I with respect to the distribution D in iteration t. Furthermore, $\alpha_t$ may be a function of the error rate of the classifier in iteration t where $\alpha_t \in (0, \infty)$. In various embodiments, y(i) may represent the true label (e.g., duplicate or non-duplicate) of data point i. In various embodiments, $h_t(i)$ may be the label predicted by the classifier (i.e., the current decision tree at time t) in iteration t for data point i. Note that the example cost function provides a three-tier weighting in which false positives are weighted or penalized the most heavily (e.g., by $\alpha_t$), false negatives are weighted or penalized less than false positives but more than correctly classified data points (although in the illustrated example, this weighting is an implicit weight of 1), and correctly classified data points are diminished or "rewarded" by a factor less than 1 (e.g., by $1/\alpha_t$). In other embodiments, other weighting schemes may be utilized to penalize false positives more heavily than false negatives.

Figure 5:
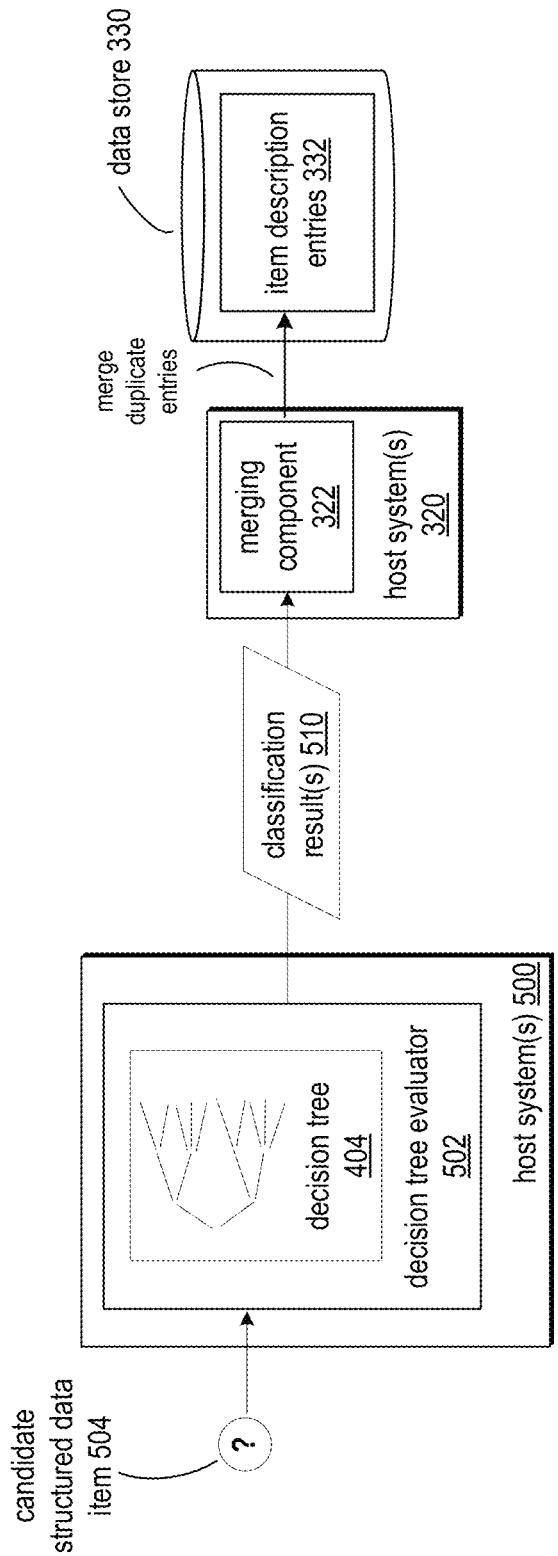
FIG. 5 illustrates a block diagram of the components used to evaluate a boosted decision tree classification model for classifying structured data items as duplicates or non-duplicates, according to some embodiments.

In various embodiments, the collection of decision tree 404 and a decision tree evaluator 502 (FIG. 5) may form a classification model that may be evaluated to classify newly considered structured data items, which may be referred to herein as candidates. FIG. 5 illustrates a block diagram including the evaluation of such a classification model for classifying candidates as duplicates or non-duplicates.

In the illustrated embodiments, the classification model may be implemented as a decision tree evaluator 502 on one or more host systems 500. In various embodiments, host system(s) 500 may be implemented as one or more computer systems, such as the computer system of FIG. 7 described below. The components illustrated within host system(s) 500 may be implemented as computer-executable instructions on such a computer system. Likewise, data structures and other information represented within host system(s) 500 may be stored within memory of such a computer system. In some cases, the candidate structured data item may also be stored within such memory.

In the illustrated embodiment, decision tree evaluator 502 may be configured to evaluate one or more candidate structured data items, such as candidate structured data item 504. The candidate may in various embodiments represent a duplicate or a non-duplicate and the decision tree evaluator may perform various operations in order to generate a classification result 510 that indicates whether the candidate is classified as a duplicate or a non-duplicate. To determine whether the candidate is to be classified as a duplicate or a non-duplicate, decision tree evaluator 502 may evaluate the candidate 504 with decision tree 404 in order to determine which label, duplicate or non-duplicate, applies to the candidate. If the result of the decision tree evaluation indicates the candidate is a duplicate, decision tree evaluator 502 may generate classification result 510 such that the classification result indicates the candidate is a duplicate. If the result of the decision tree evaluation indicates the candidate is a non-duplicate, decision tree evaluator 502 may generate classification result 510 such that the classification result indicates the candidate is a non-duplicate.

In some embodiments, the classification result(s) 510 may be provided to a merging component 322 implemented on a host system 320, which may be a computer system, such as the computer system of FIG. 7 described below. As describe above with respect to FIG. 3, this merging component may be configured to determine whether the classification result indicates the candidate is a duplicate and, if so, generate an instruction or other indication to merge the corresponding pair of item description entries within data store 330. In various embodiments, these item description entries 332 may serve as the information from which item detail pages 112 (FIG. 1) are generated. As such, merging duplicates within data store 330 may propagate to the item detail pages and solve the fragmentation of item detail pages for the same item. Similarly, by penalizing false positives using the cost function described above, the chance of mistakenly merging the item description entries (and corresponding item detail pages) is minimized. Nevertheless, in some cases where perfect precision cannot be guaranteed, one or more human agents may review and confirm the classification results prior to merging.

Example Methods

Figure 6A:
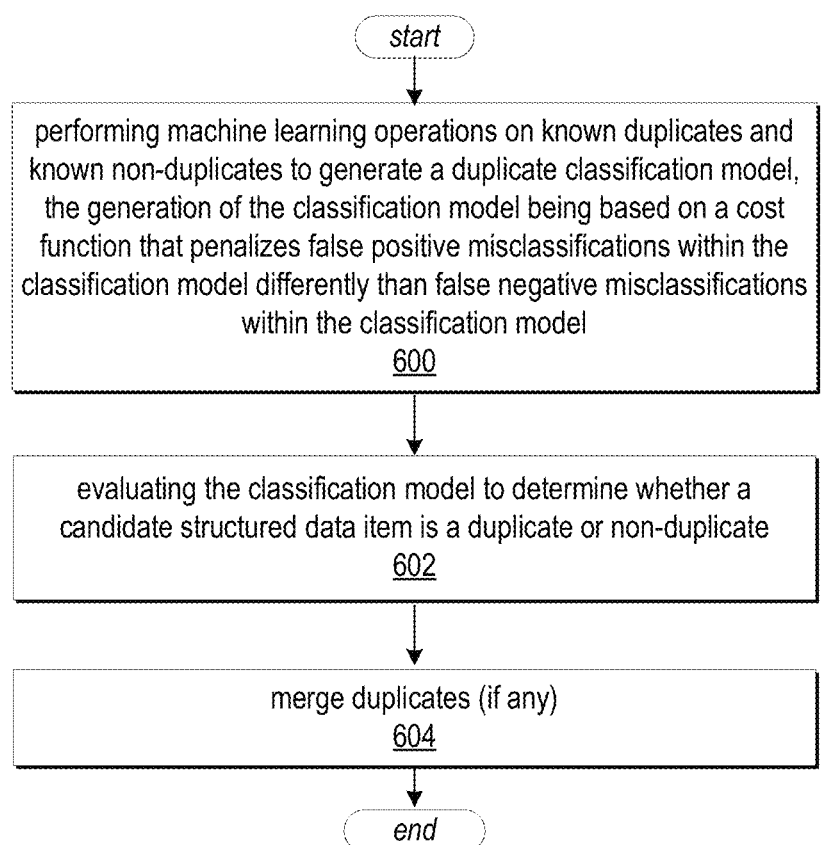
FIG. 6A illustrates a flowchart of an example method for generating and evaluating a classification model for classifying structured data items as duplicates or non-duplicates, according to some embodiments.

FIG. 6A illustrates an example method that may be performed in accordance with some embodiments of the system and method for generating a classification model with a cost function having different penalties for false positives and false negatives. In various embodiments, the illustrated method may be implemented by a computer system, such as the computer system of FIG. 7 described below. As illustrated at block 600, the method may include performing machine learning operations on duplicates and non-duplicates to generate a duplicate classification model. Examples of techniques that may be utilized to generate such duplicate classification model may include those described above with respect to FIGS. 2 and 4. For instance, this portion of the method may include generating a hyperplane solution as part of a support vector machine analysis or generating a boosted decision tree. As illustrated, the generation of the classification model may be based on a cost function that penalizes false positive misclassifications within the classification model differently than false negative misclassifications within the classification model. Examples of such cost functions include equations 2 and 3 described above.

As illustrated at block 602, the method may include evaluating the classification model to determine whether a candidate pair of structured data items is a duplicate or non-duplicate. For instance, this portion of the method may include mapping a candidate item to a hyperspace to determine on which side of hyperplane that item resides (e.g., a duplicate side or non-duplicate side) and classifying the candidate accordingly, such as described above with respect to FIG. 3. In another example, this portion of the method may include evaluating a boosted decision tree to classify a candidate as a duplicate or non-duplicate, such as described above with respect to FIG. 5. As illustrated at block 604, the method may also include merging any found duplicates. For instance, this portion of the method may include merging item description entries and/or item detail pages, such as described above with respect to merging component 322.

While the description herein largely refers to classification of structured data items as duplicates or non-duplicates, embodiments need not be limited to these two types of classifications. In general, any classification of a structured data item as member of a first classification or a second classification may be performed. For example, within the context of child safety, any of the techniques described herein may be utilized to classify structured data items as child-safe (e.g., a first classification) or non-child-safe (e.g., a second classification). In another example, within the context of allergy safety, any of the techniques described herein may be utilized to classify structured data items as allergen-free (e.g., a first classification) or as non-allergen-free (e.g., a second classification). In these cases, the known structured data items utilized to generate the classification models may be tailored to the particular application at hand. For instance, in the aforesaid child safety example, instead of non-duplicates 212 and duplicates 214 (see e.g., FIGS. 2 and 4), embodiments may utilize other data that specifies known child safe items and known non-child-safe items. As such, performing the techniques described herein on such data may yield classification models (e.g., SVM 302 or decision tree evaluator 502) that classify structured data items as child-safe (e.g., a first classification) or non-child-safe (e.g., a second classification). Similar techniques may be applied to the aforesaid allergen example and other types of classifications.

Figure 6B:
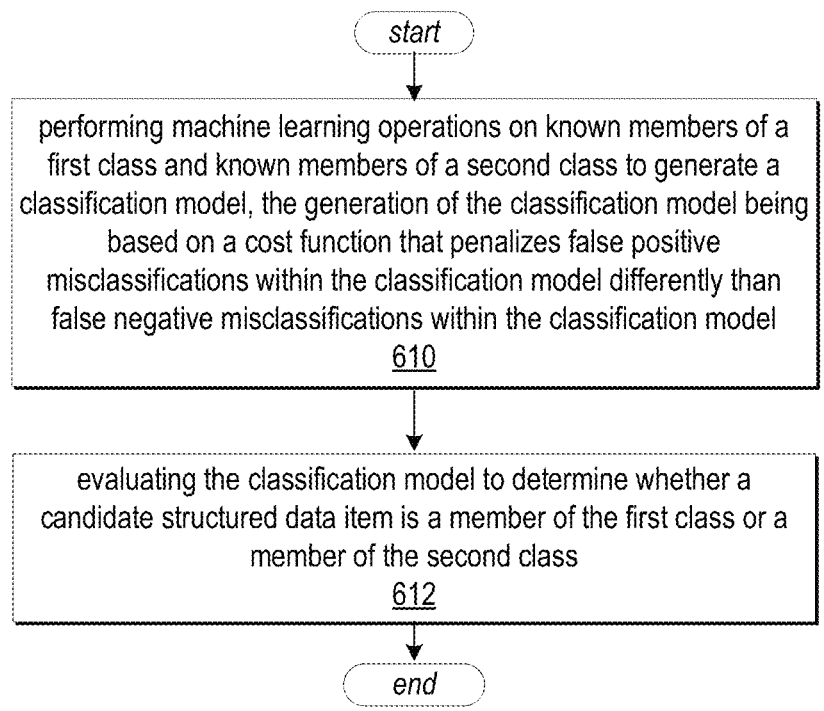
FIG. 6B illustrates a flowchart of an example method for generating and evaluating a classification model for classifying structured data items as members of a first classification or members of a second classification, according to some embodiments.

FIG. 6B illustrates an example method that may be performed in accordance with some embodiments of the system and method for generating a classification model with a cost function having different penalties for false positives and false negatives. In various embodiments, the illustrated method may be implemented by a computer system, such as the computer system of FIG. 7 described below.

As illustrated at block 610, the method may include performing machine learning operations on members of a first class and members of a second class to generate a classification model. Examples of techniques that may be utilized to generate such classification model may include techniques similar to those described above with respect to FIGS. 2 and 4 applied to known members of a first classification (e.g., child-safe or allergen free, as in the examples described above) and known members of a second classification (e.g., non-child-safe or non-allergen-free, as in the examples described above). For instance, this portion of the method may include generating a hyperplane solution as part of a support vector machine analysis or generating a boosted decision tree. As illustrated, the generation of the classification model may be based on a cost function that penalizes false positive misclassifications within the classification model differently than false negative misclassifications within the classification model. Examples of such cost functions include equations 2 and 3 described above. As illustrated at block 612, the method may include evaluating the classification model to determine whether a candidate pair of structured data items is a member of the first class or member of the second class. For instance, this portion of the method may include mapping a candidate structured data item to a hyperspace to determine on which side of hyperplane that item resides (e.g., a side associated with the first classification or a side associated with the second classification) and classifying the candidate accordingly, such as described above with respect to FIG. 3. In another example, this portion of the method may include evaluating a boosted decision tree to classify a candidate as a member of the first classification or member of the second classification, such as described above with respect to FIG. 5.

Example Computer System

Various embodiments of the system and method for generating a classification model with a cost function having different penalties for false positives and false negatives, as described herein, may be executed on one or more computer systems, which may interact with various other devices. Note that any component, action, or functionality described above with respect to FIGS. 1-6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement any functionality of host systems 260, 300, 320, 410, 500, and any components or elements thereof, as described above. Additionally, data 732 of memory 720 may store any of the information or data structures described above, including but not limited to any data stored on or accessed by such host systems, as described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
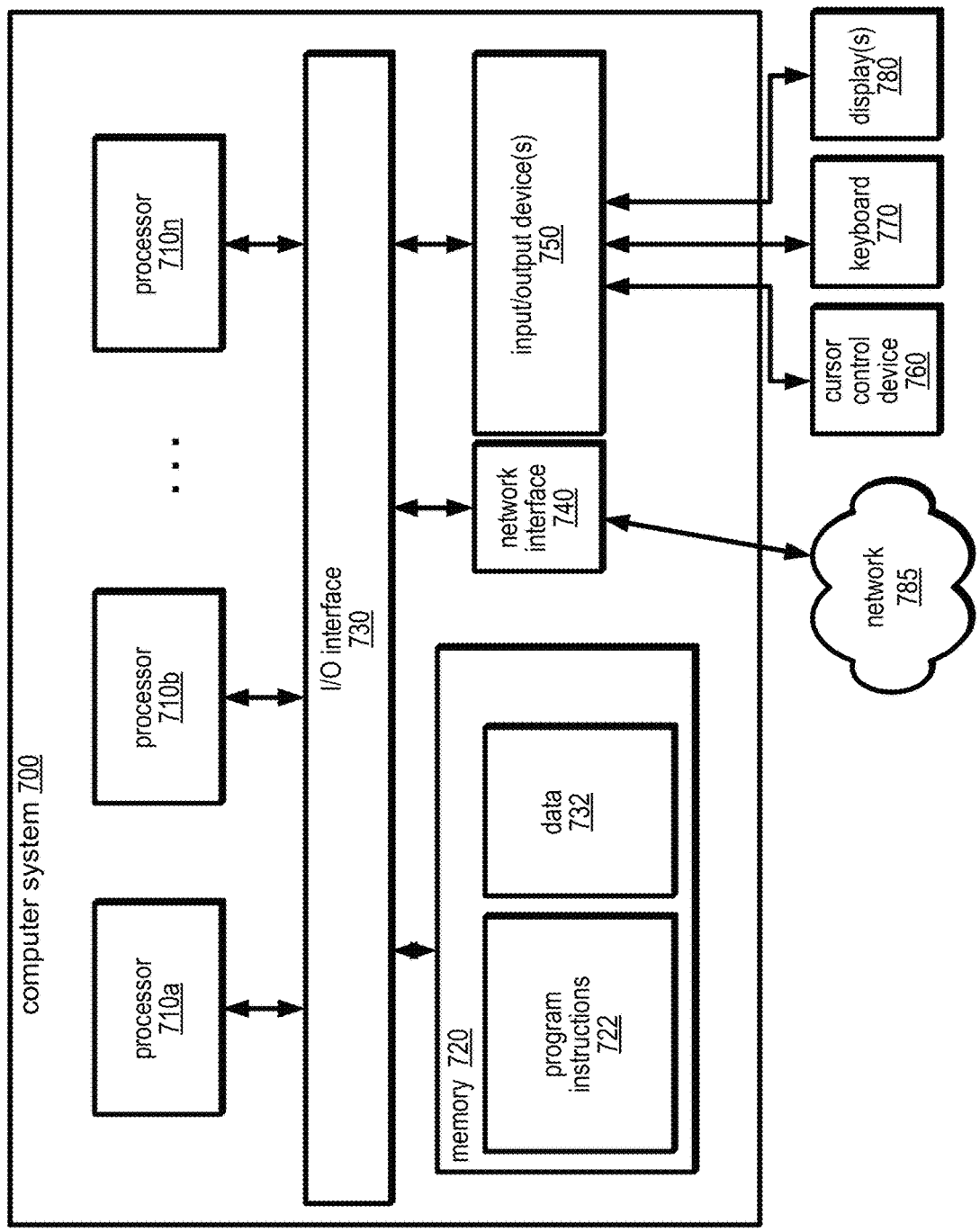
FIG. 7 illustrates one example of a computer system suitable for implementing various elements of the system and method for generating a classification model with a cost function having different penalties for false positives and false negatives, according to some embodiments.

As shown in FIG. 7, memory 720 may include program instructions 722, which may be processor-executable to implement any element or action described above. In one embodiment, the program instructions may implement the methods described above, such as the method illustrated by FIGS. 6A-6B. In other embodiments, different elements and data may be included. Note that data 732 may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
conditioning item description pairs that are descriptive of items, wherein conditioning comprises applying one or more rule conditions of a set of duplicate detection rules to attributes of item description pairs to determine whether individual ones of the item description pairs are non-duplicates or duplicates, wherein the item description pairs include at least one item description pair having a missing attribute, than other ones of the item description pairs, to which the rule conditions are applied to determine whether the individual item description pairs are non-duplicate or duplicate, and wherein conditioning further comprises populating the missing attribute of the at least one item description pair with a value according to a given range;
storing labeled structured data items, wherein:
the labeled structured data items are labeled, based on the determinations, as known duplicate descriptions or as known non-duplicate descriptions;
a known duplicate description comprises a pair of structured data items that are textually different from one another and that both describe a single identical common item, and
a known non-duplicate comprises a pair of structured data items that respectively describe two different items;
generating, based at least in part on performing machine learning operations on the labeled structured data items that describe items, a classification model for classifying structured data items as duplicate descriptions of an item or non-duplicate descriptions of an item, wherein said generating the classification model comprises applying a cost function that penalizes false positives differently than false negatives, wherein each false positive is a misclassification within the classification model of known non-duplicates as duplicates, and wherein each false negative is a misclassification within the classification model of known duplicates as non-duplicates;
determining, based at least in part on evaluating the classification model for each given candidate pair of a plurality of candidate pairs of structured data items, whether the given candidate pair of structured data items is descriptive of a duplicate item or descriptive of a non-duplicate item, wherein each candidate pair of the plurality of candidate pairs is a pair of item description entries each describing a single item within a product catalog of items offered in commerce; and
preventing creation within the product catalog of multiple item detail pages that each allow remote customers to order the single identical common item, wherein preventing comprises
merging, in response to said determining based at least in part on the evaluating, that a candidate pair of the plurality of candidate pairs of structured data items is a duplicate whose item description entries both describe a single identical common item, the pair of item description entries of the candidate pair into a single item description entry within a data store describing the single identical common item.

2. The computer-implemented method of claim 1, wherein the method further comprises, based on the merged item description entry, generating an item detail page for the item corresponding to that merged item description entry, wherein the item detail page is accessible to remote customers through an electronic marketplace.

3. The computer-implemented method of claim 1, wherein to penalize the false positives differently than the false negatives, the method comprises assigning different weights to false positives and false negatives within the cost function, wherein the false positives are weighted more heavily than the false negatives.

4. The computer-implemented method of claim 1, further comprising automatically propagating the merged single item description entry to multiple item detail pages that each allow remote customers to order the single identical common item, wherein said automatically propagating comprises consolidating the multiple item detail pages into a single item detail page that includes the merged single item description and allows remote customers to order the single identical common item.

5. The computer-implemented method of claim 1, wherein said classification model includes one or more of: a support vector machine, or a decision tree with adaptive boosting.

6. A computer-implemented method, comprising:
conditioning item description pairs that are descriptive of items, wherein conditioning comprises applying one or more rule conditions of a set of duplicate detection rules to attributes of item description pairs to determine whether individual ones of the item description pairs are members of a first classification or members of a second classification, wherein the item description pairs include at least one item description pair having a missing attribute, than other ones of the item description pairs, to which the rule conditions are applied to determine whether the individual item description pairs are members of a first or a second classification, and wherein conditioning further comprises populating the missing attribute of the at least one item description pair with a value according to a given range;
storing labeled structured data items, wherein:
the labeled structured data items are labeled, based on the determinations, as known members of the first classification or known members of the second classification;
the known members of the first classification are textually different from one another and each describe a same single item offered within a product catalog of items offered in commerce; and
the known members of the second classification are textually different from one another and do not describe said same single item;
generating, based at least in part on performing machine learning operations on the labeled structured data items that describe items, a classification model for classifying structured data items as being members of the first classification or members of the second classification, wherein said generating the classification model comprises applying a cost function that penalizes false positives differently than false negatives, wherein each false positive is a misclassification within the classification model of a known member of the second classification as a member of the first classification, and wherein each false negative is a misclassification within the classification model of a known member of the first classification as a member of the second classification;

determining, based at least in part on evaluating the classification model for each candidate structured data item of a plurality of structured data items, whether the candidate structured data item is a member of the first classification or a member of the second classification; and preventing creation within the product catalog of multiple detail pages that each allow remote customers to order a same single item, wherein preventing comprises merging, in response to said determining based at least in part on said evaluating, members of the first classification into a single description of said same single item within a data store.

7. The computer-implemented method of claim 6, wherein to penalize the false positives differently than the false negatives, the method comprises assigning different weights to false positives and false negatives within the cost function, wherein the false positives are weighted more heavily than the false negatives.

8. The computer-implemented method of claim 6, further comprising generating another classification model based at least in part on performing machine learning operations comprises generating the other classification model as a support vector machine configured to classify structured data items as members of the first classification or members of the second classification.

9. The computer-implemented method of claim 8, wherein the support vector machine comprises a representation of a hyperspace, a hyperplane that separates the hyperspace into a first portion and a second portion, and a kernel function that maps a given structured data item to a respective location within the first portion or the second portion of the hyperspace.

10. The computer-implemented method of claim 9, wherein the first portion of the hyperspace is associated with the first classification, wherein the second portion of the hyperspace is associated with the second classification.

11. The computer-implemented method of claim 10, wherein said determining whether the candidate structured data item is a member of the first classification or a member of the second classification comprises using the kernel function to map the candidate structured data item to a location within the hyperspace, and assigning the first classification or the second classification to the candidate structured data item based on which portion of the hyperspace that candidate structured data item is mapped to according to the kernel function.

12. The computer-implemented method of claim 6, further comprising automatically propagating the merged single description of said same single item to multiple item detail pages that each allow remote customers to order said same single item, wherein said automatically propagating comprises consolidating the multiple item detail pages into a single item detail page that includes the merged single description of said same single item and allows remote customers to order said same single item.

13. The computer-implemented method of claim 6, wherein said penalize includes biasing the cost function to penalize false positives more than false negatives such that said penalize reduces the chance of a merchant mistakenly merging descriptions of two different items into a common description, and reduces the probability of having a customer receive one of the two different items in error.

14. The computer-implemented method of claim 6, further comprising automatically directing a human agent to review a subset of classification results of said evaluating prior to said merging.

15. The computer-implemented method of claim 6, wherein the method comprises using adaptive boosting to generate a classification tree as the classification model, and wherein said adaptive boosting is dependent on said cost function.

16. A system, comprising:

one or more memories; and one or more processors coupled to the memory, wherein the one or more memories comprise program instructions executable by the one or more processors to:

condition item description pairs that are descriptive of items, wherein conditioning comprises apply one or more rule conditions of a set of duplicate detection rules to attributes of item description pairs to determine whether individual ones of the item description pairs are members of a first classification or members of a second classification, wherein the item description pairs include at least one item description pair having a missing attribute, than other ones of the item description pairs, to which the rule conditions are applied to determine whether the individual item description pairs are members of a first or a second classification, and wherein conditioning further comprises populating the missing attribute of the at least one item description pair with a value according to a given range;

store labeled structured data items, wherein:

the labeled structured data items are labeled, based on the determinations, as known members of the first classification or known members of the second classification;

the known members of the first classification are textually different from one another and each describe a same single item offered within a product catalog of items offered in commerce;

the known members of the second classification are textually different from one another and do not describe said same single item;

generate, based at least in part on performance of machine learning operations on labeled structured data items that describe items, a classification model for classifying structured data items as being members of the first classification or members of the second classification, wherein said generation of the classification model comprises application of a cost function that penalizes false positives, each of which is a misclassification within the classification model of a known member of the second classification as a member of the first classification, differently than false negatives, each of which is a misclassification within the classification model of a known member of the first classification as a member of the second classification;

determine, based at least in part on an evaluation for each candidate structured data item of a plurality of structured data items, whether the candidate structured data item is a member of the first classification or a member of the second classification; and prevent creation within the product catalog of multiple item detail pages that each allow remote customers to order said same single item, wherein prevent creation comprises merge, in response to said determine based on said evaluation, members of the first classification into a single description of said same single item within a data store.

17. The system of claim 16, wherein to penalize the false positives differently than the false negatives, the system is configured to assign different weights to false positives and false negatives within the cost function, wherein the false positives are weighted more heavily than the false negatives.

18. The system of claim 16, wherein the system is configured to generate the classification model as a classification tree for classifying structured data items as members of the first classification or members of the second classification.

19. The system of claim 18, wherein the system is configured to use adaptive boosting to generate the classification tree, wherein said adaptive boosting is dependent on said cost function.

20. The system of claim 16, wherein the system is configured to automatically propagate the merged single description of said same single item to multiple item detail pages that each allow remote customers to order said same single item, wherein said automatically propagating comprises consolidating the multiple item detail pages into a single item detail page that includes the merged single description of said same single item and allows remote customers to order said same single item.

21. The system of claim 16, wherein each member of the first classification describes an item which is child-safe and each member of the second classification describes an item which is not child-safe.

22. The system of claim 16, wherein the system is configured to generate the classification model as a support vector machine configured to classify structured data items as members of the first classification or members of the second classification.

23. A computer-readable non-transitory storage medium, storing program instructions computer-executable on a computer, wherein the program instructions are configured to:
condition item description pairs that are descriptive of items, wherein conditioning comprises apply one or more rule conditions of a set of duplicate detection rules to attributes of item description pairs to determine whether individual ones of the item description pairs are members of a first classification or members of a second classification, wherein the item description pairs include at least one item description pair having a missing attribute, than other ones of the item description pairs, to which the rule conditions are applied to determine whether the individual item description pairs are members of a first or a second classification, and wherein conditioning further comprises populating the missing attribute of the at least one item description pair with a value according to a given range;
store labeled structured data items, wherein:
the labeled structured data items are labeled, based on the determinations, as known members of the first classification or known members of the second classification;
the known members of the first classification that are textually different from one another and each describe a same single item offered within a product catalog of items offered in commerce;
the known members of the second classification that are textually different from one another and do not describe said same single item;
generate, based at least in part on performance of machine learning operations on labeled structured data items that describe items, a classification model for classifying structured data items as being members of the first classification or members of the second classification, wherein said generation of the classification model comprises application of a cost function that penalizes false positives, each of which is a misclassification within the classification model of a known member of the second classification as a member of the first classification, differently than false negatives, each of which is a misclassification within the classification model of a known member of the first classification as a member of the second classification;
determine, based at least in part on an evaluation for each candidate structured data item of a plurality of structured data items, whether the candidate structured data item is a member of the first classification or a member of the second classification; and
prevent creation within the product catalog of multiple item detail pages that each allow remote customers to order said same single item, wherein prevent creation comprises
merge, in response to said determine based on said evaluation members of the first classification into a single description of said same single item within a data store.

24. The computer-readable non-transitory storage medium of claim 23, wherein to penalize the false positives differently than the false negatives, the program instructions are configured to assign different weights to false positives and false negatives within the cost function, wherein the false positives are weighted more heavily than the false negatives.

25. The computer-readable non-transitory storage medium of claim 23, wherein the program instructions are configured to generate another classification model as a support vector machine configured to classify structured data items as members of the first classification or members of the second classification.

26. The computer-readable non-transitory storage medium of claim 23, wherein the program instructions are configured to automatically propagate the merged single description of said same single item to multiple item detail pages that each allow remote customers to order said same single item, wherein said automatically propagating comprises consolidating the multiple item detail pages into a single item detail page that includes the merged single description of said same single item and allows remote customers to order said same single item.

27. The computer-readable non-transitory storage medium of claim 23, wherein each member of the first classification describes an item which is allergen-free and each member of the second classification describes an item which is not allergen-free.

28. The computer-readable non-transitory storage medium of claim 23, wherein the program instructions are configured to generate the classification model as a classification tree for classifying structured data items as members of the first classification or members of the second classification.

29. The computer-readable non-transitory storage medium of claim 28, wherein the program instructions are configured to use adaptive boosting to generate the classification tree, wherein said adaptive boosting is dependent on said cost function.

* * * * *